United States Patent [19]

Rau et al.

[11] 3,931,711

[45] Jan. 13, 1976

[54] CONTROLLER ASSEMBLY

[75] Inventors: Jim Lee Rau, Lafayette; Laurence L. Miller, West Lafayette, both of Ind.

[73] Assignee: TRW Inc., Cleveland, Ohio

[22] Filed: Nov. 6, 1974

[21] Appl. No.: 521,209

[52] U.S. Cl. .................. 60/445; 60/479; 180/79.2; 418/61 B
[51] Int. Cl.² ........................................ F16H 39/46
[58] Field of Search .................. 180/79.2; 418/61 B; 91/375 A; 60/386, 389, 445, 462, 479, 494

[56] References Cited
UNITED STATES PATENTS

| | | | |
|---|---|---|---|
| 3,180,091 | 4/1965 | Bruno | 60/462 |
| 3,333,416 | 8/1967 | Budzich | 180/79.2 R X |
| 3,452,543 | 7/1969 | Goff et al. | 60/386 R X |
| 3,481,147 | 12/1969 | Goff | 180/79.2 R X |

Primary Examiner—Edgar W. Geoghegan

[57] ABSTRACT

An improved controller assembly is utilized in a hydrostatic steering system having an engine driven pump with a servomotor which is effective to vary the displacement of the pump upon operation of a pressure responsive valve assembly. The controller assembly includes a housing having a valve chamber with an inlet port which receives fluid from the pump. Upon rotation of a steering wheel, a controller valve member is moved to an actuated position and a metered flow of fluid is conducted from the valve chamber through a motor port to a steering motor. In addition, fluid is conducted from the steering motor through another motor port to the controller valve chamber. The fluid from the steering motor is then discharged from the valve chamber to reservoir or drain through an outlet port. The controller assembly also includes a control port connected in fluid communication with the pressure-responsive valve assembly. Surfaces on the controller valve member and housing cooperate to form an orifice which causes the fluid pressure conducted to the control port to vary as a function of variations in the rate at which the steering wheel is rotated, and in addition to the pressure required to overcome any variable steered load.

15 Claims, 12 Drawing Figures

CONTROLLER ASSEMBLY

BACKGROUND AND SUMMARY OF THE INVENTION

The present invention relates to a controller assembly for use in a vehicle steering system, and more specifically to a controller assembly which is utilized in a hydrostatic steering system having a variable displacement pump which supplies fluid under pressure through the controller assembly to a steering motor.

In copending application Ser. No. 521,236, entitled "Vehicle Steering System", and assigned to the assignee of the present invention, there is disclosed a variety of steering systems which incorporate a metering mechanism which is operable at varying rates in accordance with the steering demanded by the vehicle operator. The systems function to deliver fluid from a source to that metering mechanism in accordance with the rate of operation of the metering mechanism. Advantages of such systems are set forth therein and will not be repeated herein.

The present invention is directed to a controller assembly for use in such systems as disclosed in the aforesaid application Ser. No. 521,236. The controller assembly, in general, includes a directional valve and a metering unit. The controller assembly is connected to the steering wheel so that the valve and metering unit are operated in accordance with the extent and rate of turning of the steering wheel. The controller assembly has a pair of motor ports which are connected with respective opposite chambers of a steering motor, an inlet port connected with a fluid source, preferably a variable displacement pump, and a control port which is connected with a valve assembly, which valve assembly is operable in response to a variation in a pressure signal to effect a change in the displacement of the pump.

To promote the generation of a pressure signal for controlling pump displacement, a variable orifice is provided in the controller assembly. This variable orifice causes the fluid operating pressure conducted to the control port to vary as a function of the rate of rotation of the steering wheel, i.e., the demand for steering. The orifice is formed by cooperation between surfaces disposed on a movable valve member and a housing therefor.

Accordingly, it is an object of this invention to provide a controller assembly for use in a hydrostatic steering system having a variable displacement pump and a pressure-responsive valve and motor arrangement for effecting variations in the displacement of the pump and wherein the controller assembly includes a directional valve, a metering unit and a variable orifice which is effective to cause the fluid operating pressure conducted from a housing control port to vary as a function of variations in steering wheel movement and/or steering loads.

BRIEF DESCRIPTION OF THE DRAWINGS

The foregoing and other objects and features of the present invention will become apparent upon a consideration of the following description taken in connection with the accompanying drawings wherein.

DESCRIPTION OF SPECIFIC PREFERRED EMBODIMENTS OF THE INVENTION

Figures 1, 2, 3:
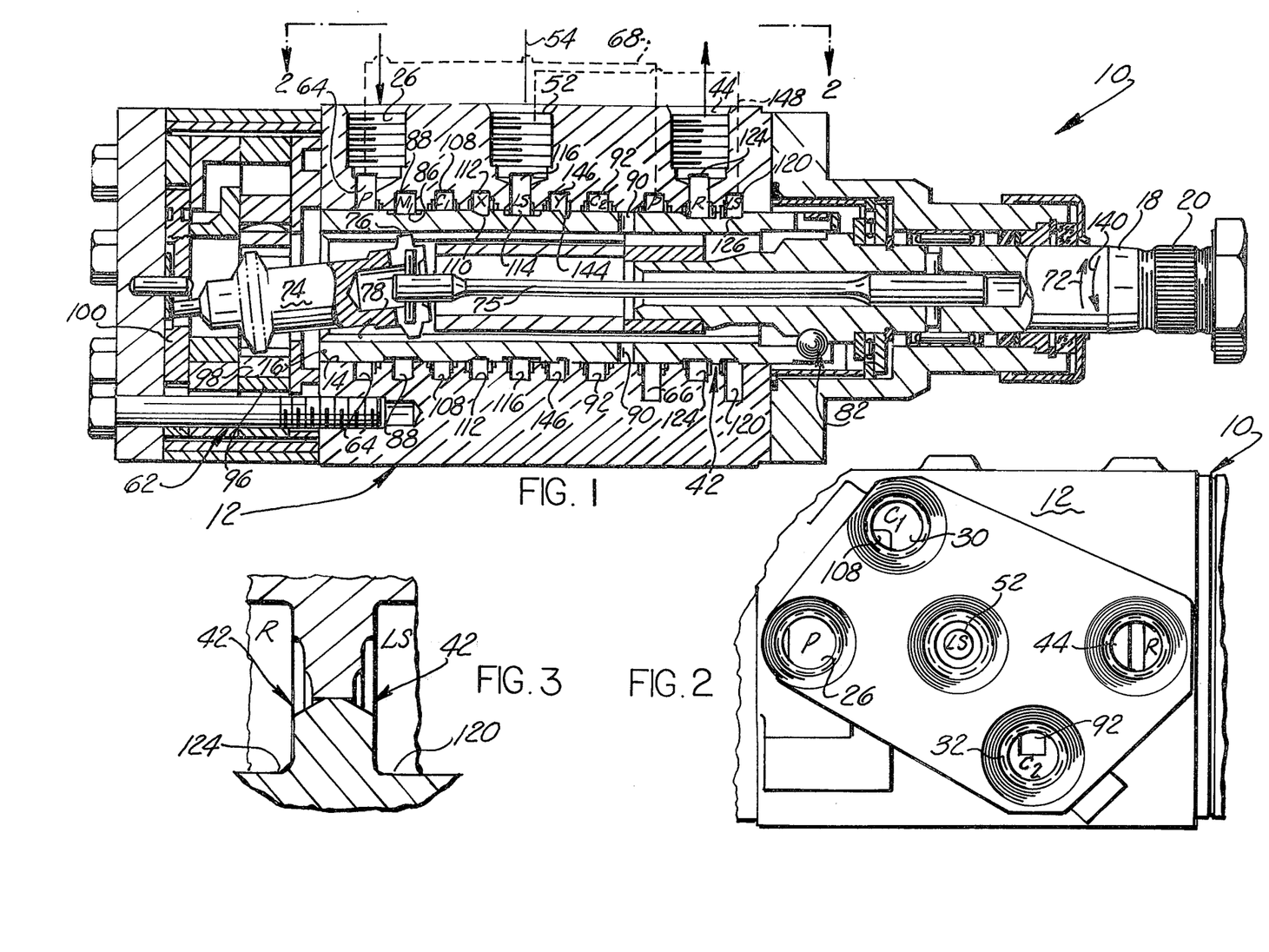
FIG. 1 is sectional view of a controller assembly constructed in accordance with the present invention.
FIG. 2 is a plan view, taken generally along the line 2—2 of FIG. 1, and illustrating the relationship between inlet, outlet, motor and control ports in a housing of the controller assembly.
FIG. 3 is an enlarged view of a portion of the controller of FIG. 1.

A controller assembly 10 constructed in accordance with the present invention includes a housing 12 in which there is formed a generally cylindrical axially extending valve chamber 14. A cylindrical valve sleeve 16 is disposed within the valve chamber 14 and is rotated by an input shaft 18 having an end portion 20 adapted to be connected with a steering wheel. Fluid supplied by a variable displacement pump 22 (FIG. 4) driven by an engine 24 is conducted to an inlet port 26.

The controller assembly 10 is constructed to port fluid to either a motor port 30 (FIG. 2) or a motor port 32 upon rotation of shaft 18. The motor ports 30, 32 are connected by conduits 34, 36 (FIG. 4) with a piston and cylinder type steering motor 38. The relatively high pressure fluid conducted through one of the conduits 34 or 36 effects operation of the steering motor 38 to turn steerable vehicle wheels. The fluid discharged from the steering motor 38 is conducted back to one of the motor ports 30 or 32. This fluid flows through a variable orifice 42 to an outlet port 44 connected with a reservoir 48.

Figure 4:
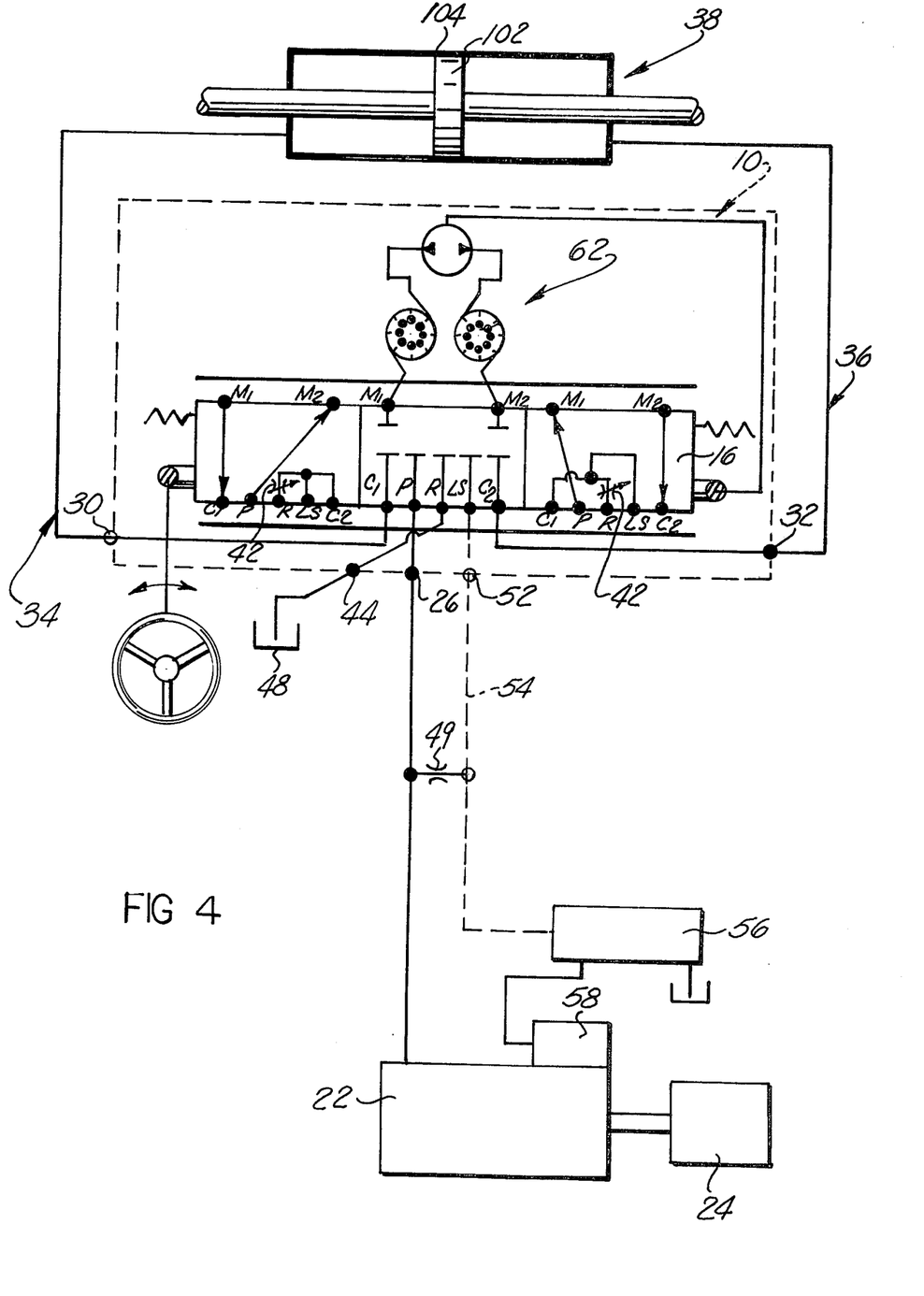
FIG. 4 is a schematic illustration depicting the relationship of the controller assembly of FIG. 1 to a steering motor, variable displacement pump and a pressure-responsive valve assembly for effecting variations in the displacement of the pump.

A control fluid pressure which varies as a function of variations in the fluid pressure at the upstream side of the orifice 42 is communicated through a control port 52 to a conduit 54 and a pressure-responsive valve assembly 56 (see FIG. 4). The valve assembly 56 is actuatable under the influence of fluid pressure to effect operation of a servomotor 58 to vary the displacement of the pump 22.

The specific manner in which the pressure-responsive valve assembly 56 effects operation of the motor 58 to vary the displacement of the pump 22 does not form part of the present invention and is fully set forth in the aforementioned U.S. application Ser. No. 521,236 filed Nov. 6, 1975 by Jim Lee Rau, entitled "Vehicle Steering System" and will not be further described herein to avoid prolixity of description. However, it should be noted, and as will be described below, that the fluid pressure conducted through the conduit 54 varies as a function of the rate of rotation of the shaft 18 and variations in steering loads.

The housing 12 is provided with a plurality of annular grooves in the wall of the valve chamber 14 (FIG. 1). These annular grooves are connected with the various ports in the housing and cooperate with annular lands on the tubular valve sleeve 16 to control the flow of fluid through the controller assembly 10. Upon axial movement of the valve sleeve 16, fluid from the inlet port 26 is directed to a metering assembly 62 disposed within the controller housing 12 and from the metering assembly to one of the motor ports 30, 32. Return fluid from the steering motor 38 enters the other motor port and is directed to the orifice 42 and outlet port 44.

Specifically, the inlet port 26 is connected with an annular groove 64 which circumscribes the valve sleeve 16 and is designated by the letter P in FIG. 1. The annular groove 64 is connected with a second annular groove 66 by a passage formed in the housing 12 and indicated schematically in FIG. 1 at 68. Prior to rotation of the input shaft 18, the valve sleeve 16 is in the neutral position shown in FIG. 1 blocking fluid flow to and from the valve chamber 14. When the valve is in neutral position, the pump 22 supplies fluid at a standby pressure to the valve inlet port 26. This pressure is also communicated via orifice 49 to conduit 54 and the valve assembly 56 to maintain the pump 22 in a minimum displacement condition. The pump 22 is biased to maximum displacement and a reduction in pressure in conduit 54 effects an increase in pump output, and an increase in pressure in conduit 54 effects a decrease in pump output.

Upon initial rotation of the steering wheel and input shaft 18 in the direction indicated by the arrow 72 in FIG. 1, rotation of the metering assembly 62 is hydraulically inhibited due to the steering load (as is known). Thus, shaft 74 connected with the metering assembly cannot be rotated relative to the housing 12. A head end portion 76 of the shaft 74 is provided with gear teeth which are disposed in meshing engagement with longitudinally extending internal gear teeth or splines 78 formed on the valve sleeve 16. Therefore, the shaft 74 holds the valve sleeve 16 against rotational movement in the valve chamber 14 upon initial rotation of the input shaft 18. However, the internal gear teeth 78 are ineffective to hold the valve sleeve 16 against axial movement.

Since the valve sleeve 16 is initially held against rotational movement by the shaft 74, a ball and helical groove arrangement 82 is effective to shift the valve sleeve axially toward the left (as viewed in FIG. 1) upon initial rotation of the input shaft 18. The axial movement of the valve sleeve 16 enables inlet fluid from the pump 22 (see FIG. 4) to flow from the inlet port 26 and annular groove 64 (FIG. 1) through an annular undercut 86 in the valve sleeve 16 to an annular groove 88 (also designated $M_1$ in FIG. 1) connected with the metering assembly 62. In addition, the leftward axial movement of the valve sleeve 16 connects ports 90 in the side wall of the tubular valve sleeve 16 with an annular groove 92 (also designated $C_2$ in FIG. 1 which is connected in fluid communication with the motor port 32 by an internal passage in the housing 12.

As noted, during the time when the shaft 74 cannot rotate, the valve sleeve 16 will shift axially (as is known). Interposed between the input shaft 18 and the shaft 74 is a torsion bar 75. The torsion bar 75 resists relative rotation between the shaft 18 and shaft 74. When the shaft 18 is turned without shaft 74 turning, the torsion bar 75 will flex, and accordingly the valve sleeve 16 will shift axially (due to the action of camming balls 82).

After the valve sleeve 14 has been shifted axially toward the left, high pressure fluid from the inlet port 26 is conducted from the groove 64 to the groove 88 connected with the metering assembly 62. After the pressure at the metering assembly increases sufficiently to overcome the variable steering load, the shaft 74 can rotate and the metering assembly 62 operates at a rate dependent upon the rate of turning of the steering wheel and input shaft 18.

The metering assembly 62 is of the gerotor gear type and includes an internally toothed stator 96 which cooperates with an externally toothed rotor 98 to provide a metered flow of fluid through a commutator valve plate 100 to the inside of the valve sleeve 16 as the rotor 98 rotates and orbits relative to the stator 96. The manner in which the commutator valve plate 100 and rotor 98 cooperate is the same as is disclosed in U.S. Pat. No. 3,452,543.

The metered flow of fluid is conducted from the inside of the valve sleeve 16 through the ports 90 to the groove 92 and motor port 32 (FIG. 2). Since the motor port 32 is connected with the steering motor 38 (see FIG. 4) by the conduit 36, the metered flow of high pressure fluid effects operation of the steering motor to turn the wheels of the vehicle. As the steering motor 38 is operated, a piston 102 is moved toward the left (as viewed in FIG. 4) so that fluid is discharged from a motor cylinder 104 to the conduit 34 leading to the motor port 30. The motor port 30 is connected with an annular groove 108 (also designated $C_1$ in FIG. 1) by a passage in the controller housing 12.

Since the valve sleeve 16 has been shifted toward the left (as viewed in FIG. 1) by the initial rotational movement of the input shaft 18, fluid received from the steering motor 38 can flow from the annular groove 108 through an annular recess 110 formed in the valve sleeve 16 to an annular groove 112 in the housing 12. The annular groove 112 is not connected directly with any of the outlet ports so that the fluid which flows from the steering motor 38 through the groove 108 into the groove 112 must flow out of the groove 112 through an annular recess 114 in the valve sleeve 16 into an annular groove 116 (also designated LS in FIG. 1). The groove 116 is connected with the control port 52 and conduit 54 leading to the pressure responsive valve assembly 56 (see FIG. 4). In addition, the groove 116 is connected with a second annular groove 120 (also designated LS in FIG. 1).

Since the valve sleeve 16 has been shifted toward the left (as viewed in FIG. 3), the groove 120 is connected with an annular groove 124 (also designated R in FIG. 1) through the orifice 42. The variable orifice 42, it should be understood, initially opened to a position to allow system pressure to increase in accordance with the load requirement prior to operation of the metering mechanism. When the orifice 42 initially opens, there is a drop in the stand-by pressure in advance of the orifice 42 at groove 120, which results in a reduced pressure signal being conducted to the valve assembly 56 which results in an increase in displacement of pump 22 in a known manner.

Once the metering assembly 62 starts operating, as long as the rate of steering wheel turning and steering load remain constant, the operating size of orifice 42 does not vary and the pump 22 delivers fluid at a rate to satisfy the demand. If the rate of steering wheel turning or the steering load changes, the size of the orifice 42 is changed with a resulting change in the rate of flow of fluid from the control port 52 and grooves 116, 120 to an annular groove 124 (designated R in FIG. 1). The groove 124 is connected with the outlet port 44 leading to the reservoir 48 (see FIG. 4). Therefore, fluid discharged from the steering motor 38 can flow from the motor port 30 through grooves 108, 112 and 116 in the valve chamber 14 to the control port 52. In addition, the fluid discharged from the steering motor 38 can flow from the control port 52 through the groove 120 in valve chamber 14 and orifice 42 to the outlet or drain port 44.

A fluid pressure signal is conducted through conduit 54 to the pressure-responsive valve assembly 56. That signal varies as a function of variations in the rate at which the steering wheel is turned and the metering mechanism 62 and steering motor 38 operate, and thus the signal varies with load pressure requirements and flow demand. If the rate at which the steering wheel is rotated is increased with a resulting increase in the rate of rotation of the input member 18, the orifice 42 increases in size due to the fact that shaft 74, at this time, is rotating slower than shaft 18. This results in a reduced pressure signal being communicated through conduit 54 to the pressure-responsive control valve 56 which operates to increase displacement of pump 22. Of course, increasing the displacement of the pump 22 increases the rate of fluid flow to the metering mechanism 62 and the rate at which fluid is discharged from the metering mechanism to the steering motor 38. Therefore, increasing the rate of rotation of the steering wheel and input member 18 results in an increase in the size of the orifice 42, an increase in the displacement of the pump 22, and an increase in the rate at which fluid is discharged from the metering mechanism 62 to effect a corresponding increase in the rate of operation of the steering motor 38.

If the rate of rotation of the steering wheel and input member 18 are reduced, the orifice 42 decreases in size, due to the fact that momentarily shaft 74 is rotating faster than shaft 18. This results in a higher pressure signal being communicated through conduit 54 to the pressure-responsive control valve 56 which operates to decrease displacement of pump 22. Of course, decreasing the displacement of the pump 22 decreases the rate of fluid flow to the metering mechanism 62 and the rate at which fluid is discharged from the metering mechanism to the steering motor 38. Therefore, decreasing the rate of rotation of the steering wheel and input member 18 results in a decrease in the size of the orifice 42, the displacement of the pump 22 and the rate at which fluid is discharged from the metering mechanism 62 to effect a corresponding decrease in the rate of operation of steering motor 38.

If during steering an increase in steering load is encountered, as for example, the steered wheels engaging mud, rocks, etc., the orifice 42 will increase in size due to a momentary slowing of shaft 74, resulting from an increase in pressure on rotor 98. If a decrease in steering load is encountered, as for example, the wheels engaging wet pavement, etc., the orifice 42 will reduce in size. The metering unit in this case will momentarily overrun shaft 18, causing the valve spool 16 to shift to reduce the size of the orifice 42. These changes in the size of orifice 42 effect a change in the displacement of pump 22, as described above.

From the above, it should be clear that the pressure-responsive valve assembly 56 responds to variations in the fluid pressure conducted to it from the conduit 54 to effect variations in the displacement of the pump 22 in such a manner as to maintain the rate of fluid delivered to the metering mechanism 62 in accord with demand. If the rate of turning of the steering wheel increases and/or the steering load increases, orifice 42 increases in size and the fluid pressure at the control port 54 decreases. This causes the pressure-responsive valve assembly 56 to effect operation of the swashplate motor 58 to increase the displacement of the pump 22. The reverse occurs on a decrease in the rate of turning of the steering wheel and/or a decrease in the steering load. The change in the size of orifice 42 occurs due to the interaction of the metering unit 62, valve sleeve 16, and input shaft 18. Also, it should be understood that orifice 42 not only functions in the nature of a load sense or demand orifice, but also functions as a meter-out anti-cavitation orifice.

The description above referred to turning of steering shaft 18 in one direction to turn the vehicle wheels in one direction. When the vehicle wheels are to be turned in the opposite direction, the input shaft 18 is turned in the direction of the arrow 140 in FIG. 1. Since the metering assembly 62 is initially inhibited from rotating, the initial turning movement of the input shaft 18 causes the ball and helical groove arrangement 82 to shift the valve sleeve 16 toward the right from the neutral condition of FIG. 1. When the valve sleeve 16 is shifted, fluid under pressure flows from the pump 22 (FIG. 3) to the inlet port 26 and groove 64. However, since the valve sleeve 16 moved through an incremental distance toward the right, the inlet groove 64 is blocked. Therefore, the high pressure fluid from the pump 22 flows through the internal passage 68 to the second annular pressure groove 66. At this time, the motor ports 90 in the wall of the tubular valve sleeve 16 are aligned with the annular groove 66. Therefore, high pressure fluid can flow from the annular groove 66 through the ports 90 and the inside of the valve sleeve 16 to the metering assembly 62. A metered flow of fluid is discharged from the metering assembly 62 through an internal housing passage (not shown) to the annular groove 88. Since the valve sleeve 16 has been shifted toward the right (as viewed in FIG. 1), the groove 88 is connected in fluid communication with the groove 108 through the annular undercut 86 in the valve sleeve 16. The annular groove 108 is connected with the motor port 30. Of course, the motor port 30 is connected by the conduit 34 with the steering motor 38 (see FIG. 4).

The metered flow of high pressure fluid through the conduit 34 effects operation of the steering motor 38 to turn the wheels of the vehicle. As the steering motor 38 is operated, the piston 102 moves toward the right (as viewed in FIG. 4) and fluid is discharged from the steering motor through the conduit 36 to the motor port 32. The motor port 32 is connected with the annular groove 92 (see FIG. 1). Since the valve spool 16 has been shifted toward the right (as viewed in FIG. 1), the steering motor discharge fluid flows through an annular undercut 144 in the valve sleeve 16 to an annular groove 146 (designated Y in FIG. 1). The groove 146, like the groove 112, is not connected with an outlet port so that the steering motor discharge fluid flows from the groove 146 through the annular undercut 114 to the groove 116 which is connected with the control port 52. The annular groove 116 is also connected with the groove 120 by an internal passage, indicated schematically at 148 in FIG. 1. Since the valve spool 16 has been shifted toward the right, the annular groove 120 is connected through the orifice 42 with the annular groove 124 and the outlet port 44. The outlet port 44 is connected with drain or reservoir 48 (see FIG. 4).

When the valve sleeve 16 is shifted axially to the right, the operation of the controller assembly 10 in response to variations in the rate of rotation of the steering wheel and/or variations in the steering load is as described above in connection with shifting of the valve sleeve to the left, and accordingly that description will not be repeated.

In the embodiment of the invention illustrated in FIGS. 5 through 8, components are included which are similar to the components of the embodiment of the invention illustrated in FIGS. 1 through 4, and accordingly similar numerals will be utilized to designate similar components, the suffix letter "a" being associated with the numerals of FIGS. 5 through 8 in order to avoid confusion.

The controller assembly 10a (FIG. 5) includes a housing 12a in which there is formed a generally cylindrical axially extending valve chamber 14a. A cylindrical valve sleeve 16a is disposed within the valve chamber 14a and is rotated by an input shaft 18a having an end portion 20a adapted to be connected with the steering wheel (not shown). The controller assembly 10a includes an inlet port 26a (see FIGS. 5, 6) which is connected with the output from the variable displacement steering pump 22a (see FIG. 8). A pair of motor ports 30a, 32a (see FIG. 8) are connected with a steering motor 38a by fluid conduits 34a, 36a. An outlet port 44a is connected with a reservoir 48a. In addition, a control port 52a is connected through a conduit 54a with a pressure-responsive valve assembly 56a.

Upon variations in fluid pressure conducted through the conduit 54a to the pressure-responsive valve assembly 56a, the pressure-responsive valve assembly 56a effects operation of a hydraulic motor 58a to move the swashplate of the variable displacement pump 22a. This varies the displacement of the pump 22a and the rate at which the fluid is discharged from the pump to the inlet port 26a. It should be noted that the inlet port 26a and motor ports 30a, 32a (FIG. 6) are disposed in the same positional relationship with the valve chamber 14a as are the inlet and motor ports 26, 30, 32 of the embodiment of the invention illustrated in FIGS. 1–4. However, the positions of the outlet port 44a and control port 52a relative to the valve chamber 14a are reversed from the positions of the outlet port 44 and control port 52 relative to the valve chamber 14 of FIGS. 1–4.

Figure 7:
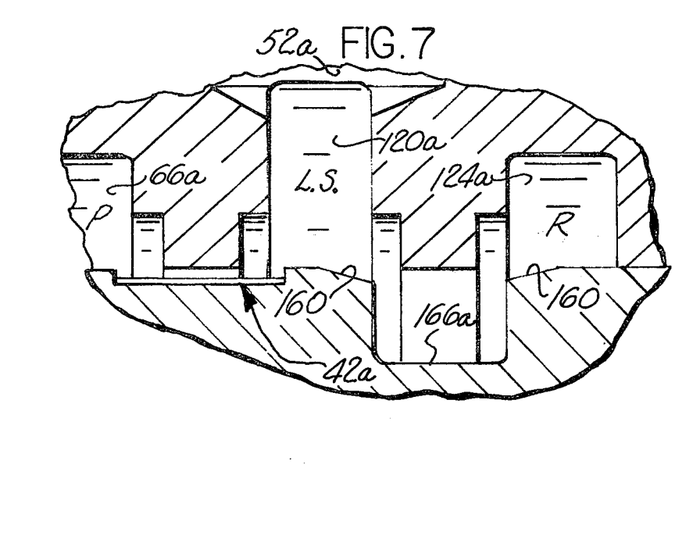
FIG. 7 is an enlarged view of a portion of the controller of FIG. 5.

Upon actuation of the valve spool 16a to either the right or left (as viewed in FIG. 5) fluid pressure from the pump 22a is ported from an annular groove 66a (also designated with the letter P in FIG. 5) to an annular groove 120a (also designated LS) through a fixed open orifice 42a, (see FIG. 7). The annular groove 120a is connected with the control port 52a. In addition, the annular groove 120a is connected with the outlet port 44a through a variable orifice 160 formed between the groove 120a and a groove 124a. The annular groove 66a is connected in fluid communication with the inlet port 26a and an annular groove 64a through an internal housing passage, indicated schematically at 68a.

Figure 5:
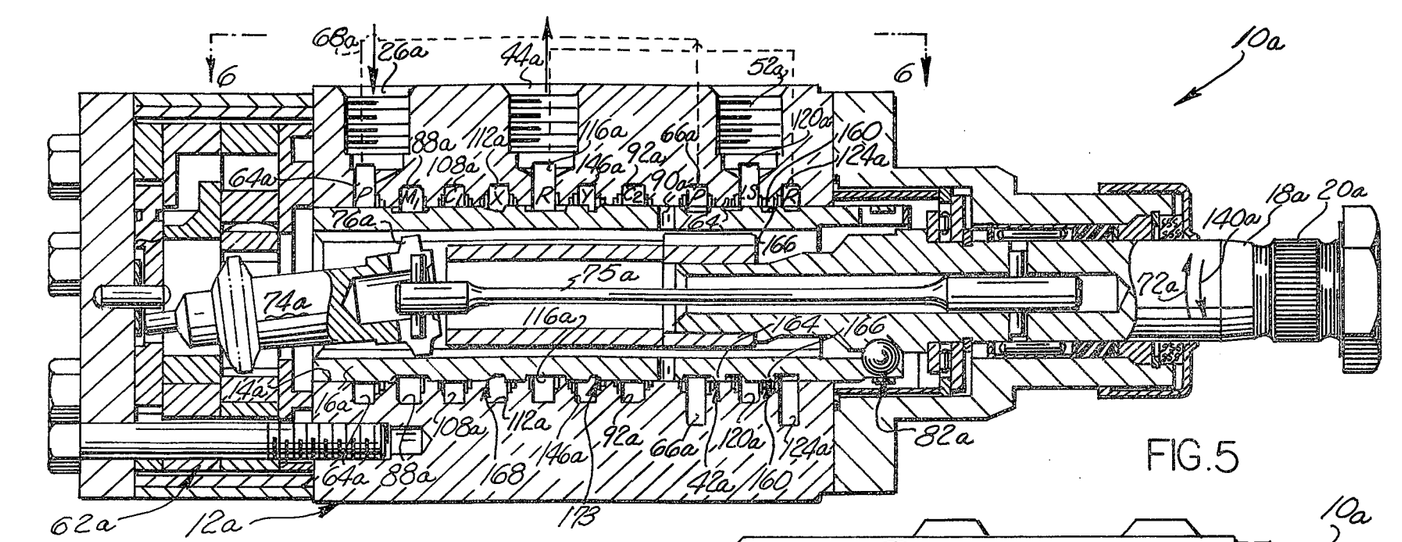
FIG. 5 is a sectional view of a controller assembly forming a second embodiment of the invention.
Figure 6:
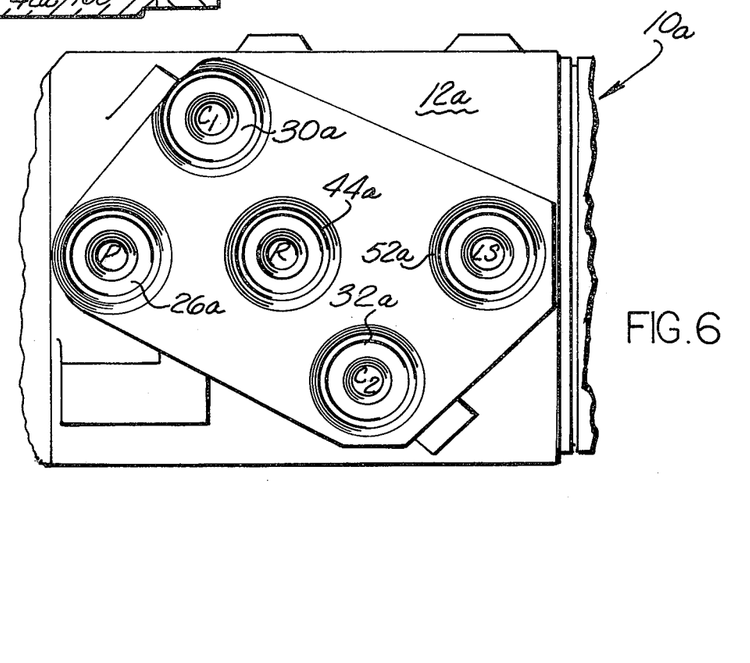
FIG. 6 is a plan view, taken generally along the line 6—6 of FIG. 5, illustrating the relationship between inlet, outlet, motor and control ports in the housing of the controller assembly of FIG. 5.

The orifices 42a, 160 are open when the valve sleeve 16a is in the neutral condition of FIG. 5. Therefore, when the valve sleeve 16a is in the neutral position, there is a continuous pilot flow of fluid through the orifice 42a to the control port 52a to establish a minimum stand-by pressure level at port 52a. This pilot flow of fluid flows through the metering-out orifice 160 and the outlet or drain port 44a. This flow returns to reservoir preferably through a suitable cooling device. Thus a continuous flow of fluid is directed through the cooler, even when the valve is in neutral.

As noted, the orifice 42a is a fixed orifice sized by the pilot flow and stand-by pressure, and orifice 160 is a variable orifice. The size of orifice 160 varies in accordance with the rate of turning of the steering wheel and/or the steering load in the manner as described above in connection with the orifice 42 of FIG. 1. Upon rotation of the input member 18a in the direction of the arrow 72a in FIG. 5, a helical ball and groove arrangement 82a shifts the valve sleeve 16a toward the left (as viewed in FIG. 5). It should be noted that upon initial rotational movement of the input member 18a, the gerotor gear type metering assembly 62a is inhibited from rotation. Therefore, shaft 74a holds the valve sleeve 16a against rotation while enabling the valve sleeve to be shifted axially in the valve chamber 14a.

Upon axial shifting of the valve sleeve 16a toward the left, the size of the orifice 42a remains constant and the size of orifice 160 decreases. In addition, fluid from the inlet port 26a can flow from the inlet groove 64a, also designated P in FIG. 5, in an annular groove 88a (also designated $M_1$) which is connected with the metering assembly 62a through an internal housing passage. The fluid output from the metering assembly 62a is conducted through the central portion of the tubular valve sleeve 16a to ports 90a which communicate with an annular groove 92a (also designated $C_2$). The groove 92a is connected in fluid communication with the motor port 32a so that a metered flow of fluid is provided through the conduit 36a (see FIG. 8) to the steering motor 38a to effect operation of the steering motor and a turning of the vehicle wheels.

As the steering motor 38a is operated, fluid is discharged from the steering motor through a conduit 34a to the motor port 30a. The motor port 30a is connected in fluid communication with an annular groove 108a (also designated $C_1$ in FIG. 5). Since the valve sleeve 16a has been shifted to the left of the position shown in FIG. 5, fluid is conducted through a rate or metering-out anticavitation control orifice 168 (see FIG. 5) to a blind groove 112a. The fluid flows from the annular groove 112a to a groove 116a (also designated R). The annular groove 116a is connected with the outlet or drain port 44a.

When the valve sleeve 16a is initially moved, the variable size orifice 160 moves toward a closed condition restricting the pilot flow of fluid therethrough and increasing the pressure at 120a. The size or cross-sectional area of orifice 160 varies as a function of variations in the rate of rotation of the steering wheel and variations in steering load. The fixed load sense orifice 42a communicates pressure through grooves 120a, 52a, and conduit 54a to the pressure-responsive valve assembly 56a.

When the steering action is occurring, it should be clear that the orifice 160 will operate on a very small flow of fluid, since the bulk flow will be directed to the steering motor 38a.

In the event that the pressure in the line 54a during steering action increases, the displacement of the pump 22a will increase. The pressure in line 54a will increase when the metering mechanism 38a is demanding steering fluid in response to increasing the rate of rotation of the steering wheel due to a reduction in the size of the orifice 160. The resulting increase in fluid pressure acting on valve assembly 56a causes an increase in the displacement of the pump 22a. Similarly, if the demand for fluid by the metering mechanism 62a decreases due to a decrease in the rate of rotation of the steering wheel, the size of orifice 160 increases. When this occurs, the fluid pressure in the conduit 54a will decrease. This results in a decrease in the displacement of the steering pump 22a.

The manner in which the pressure-responsive valve assembly 56 cooperates with the steering controller 10a to control the displacement of the pump 22a is the same as is described in U.S. Pat. application Ser. No. 521,236, filed Nov. 6, 1974 by Jim Lee Rau, and entitled "Vehicle Steering System", and will not be further described herein to avoid prolixity of description. The disclosure of that application is incorporated herein by this reference thereto.

Upon interruption of the rotation of the steering wheel and input member 18a, the metering unit 62a is operated through an incremental distance during which the shaft 74a effects rotation of the valve sleeve 16a, as is known. This causes the ball and helical groove arrangement 82a to effect a shifting of the valve sleeve 16a back to the neutral position shown in FIG. 4 with resulting increase in the size of the orifice 160. Of course, once the valve sleeve 16a has been shifted toward the position shown in FIG. 4, flow to and from the metering assembly 62a and steering motor 38a is blocked.

Figure 8:
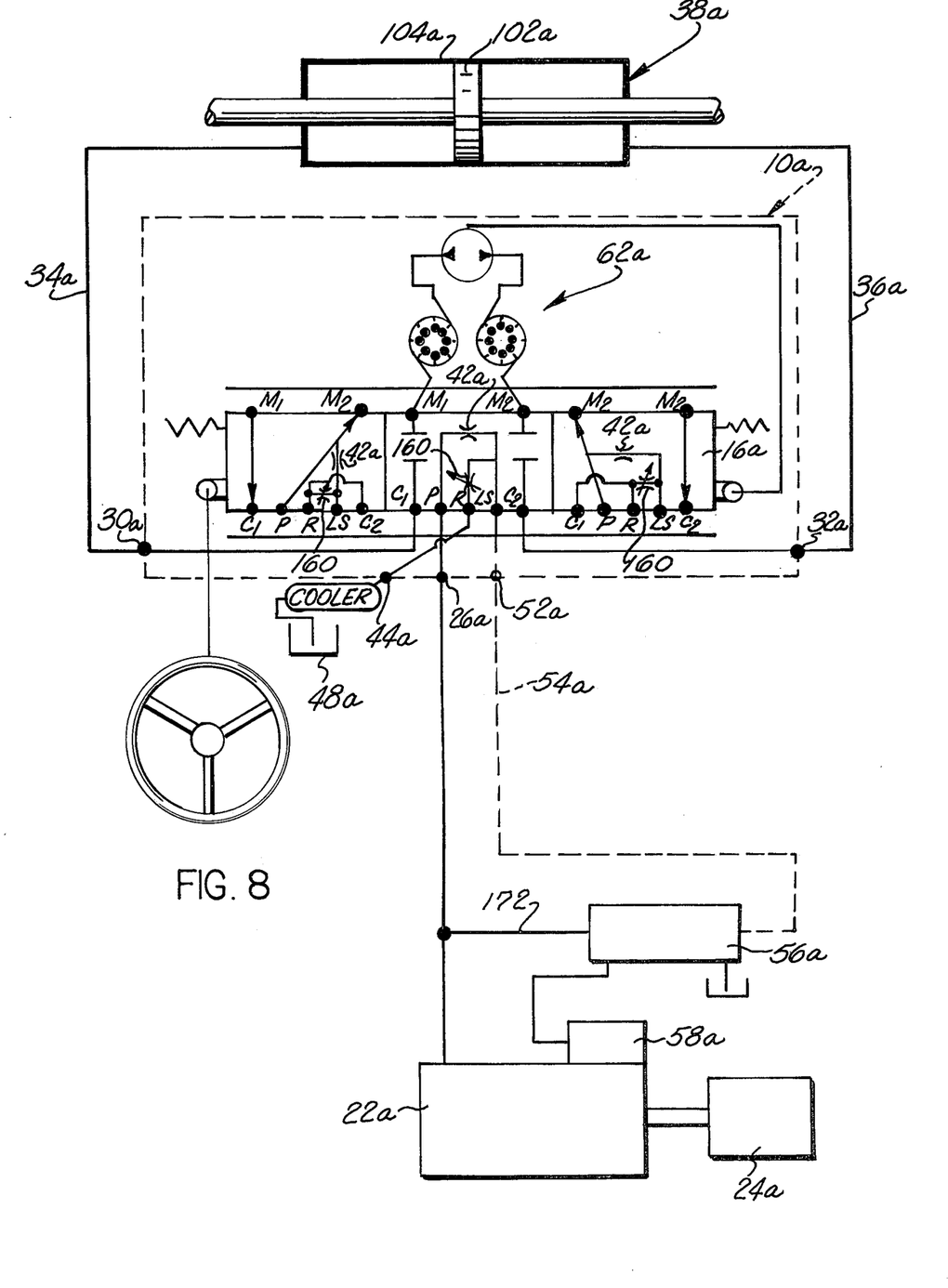
FIG. 8 is a schematic illustration depicting the relationship of the controller assembly of FIG. 5 to a steering motor, variable displacement pump and a pressure-responsive valve assembly for effecting variations in the displacement of the pump.

Upon rotation of the input member 18a in the direction of the arrow 140a in FIG. 5, the helical ball and groove arrangement 82a effects a shifting of the valve sleeve 16a toward the right, as viewed in FIG. 5. This rightward movement of the valve sleeve 16a shifts the ports 90a in the valve sleeve 16a into communication with the groove 66a which is connected in fluid communication with the inlet port 26a. Therefore, fluid from the pump 22a flows from the inlet port 26a through the groove 66a and port 90a to the interior of the tubular valve sleeve 16a. This flow of fluid is conducted to the metering assembly 62a and from the metering assembly back to the annular groove 88a through an internal housing passage. Since the valve sleeve 16a was shifted toward the right, as viewed in FIG. 5, the metered flow of fluid is conducted from the groove 88a to the groove 108a which is connected with the motor port 30a (FIG. 8). Since the motor port 30a is connected with the steering motor 38a through the conduit 34a, the steering motor 38a is operated to turn the wheels of the vehicle.

As the steering motor 38a is operated, fluid is discharged from the steering motor through a conduit 36a to the motor port 32a. The motor port 32a is connected in fluid communication with the annular groove 92a (FIG. 5). Since the valve sleeve 16a has been shifted toward the right, as viewed in FIG. 5, the fluid discharged from the steering motor 38a flows through a rate or metering-out anti-cavitation control orifice 173 to an annular groove 146a. The annular groove 146a is connected in fluid communication with the outlet port 44a through the annular groove 116a.

The fluid pressure at the inlet port 26a is transmitted through the passage 68a to the groove 66a. The inlet pressure is connected through the orifice 42a to the groove 120a which is connected in fluid communication with the control port 52a. In addition, the fluid pressure from the groove 120a is transmitted through the orifice 160 to the groove 124a which is connected with the outlet port 44a.

If the rate of rotation of the steering wheel should vary or the steering load varies, with a resulting variation in the size of the orifice 160, a load sense pressure signal is transmitted from the control port 52a through the conduit 54a to the pressure-responsive valve assembly 56a. It should be clear from FIG. 7 that the orifice 160 will operate in both directions of movement of the sleeve 16a to control the load sense pressure in groove 120a which is communicated to the pressure-responsive valve assembly 56a. Variations in this pressure signal cause the pressure-responsive valve assembly 56a to be actuated to effect operation of the motor 58a to vary the displacement of the pump 22a. Upon interruption of rotational movement of the input member 18a, the metering assembly 62a continues to operate so that the ball and helical groove arrangement 82a effects axial movement of the valve sleeve 16a leftward to the neutral position shown in FIG. 7. When this occurs, fluid to and from the metering unit 62a is blocked. Also, fluid flow to and from the steering motor 38a is blocked.

A third embodiment of the invention is illustrated in FIGS. 9–12. Since the components of the embodiment of the invention illustrated in FIGS. 9–12 are generally the same as the components of the embodiment of the invention illustrated in FIGS. 1 through 8, similar numerals will be utilized to designate similar components, the suffix letter "b" being associated with the numerals of FIGS. 9–12 to avoid confusion.

Figure 9:
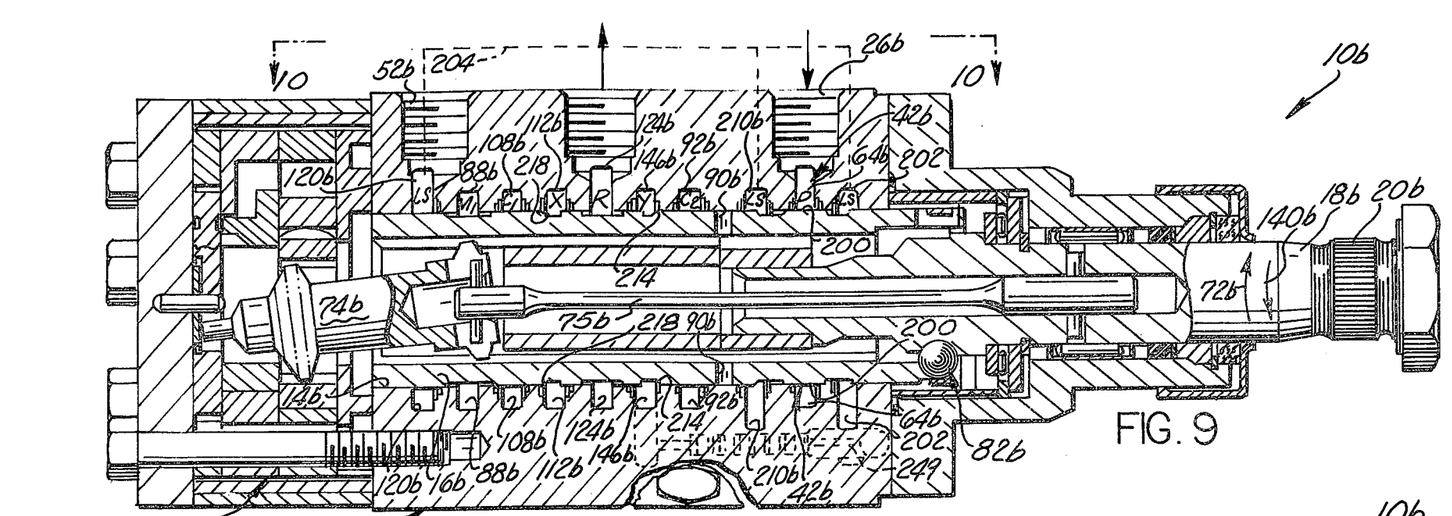
FIG. 9 is a sectional view of a controller assembly forming another embodiment of the invention.
Figure 10:
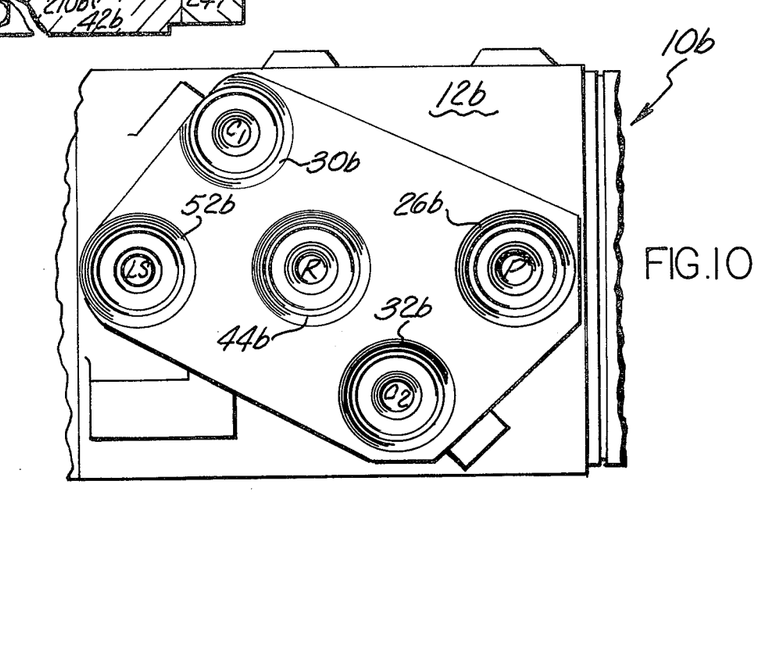
FIG. 10 is a plan view, taken generally along the line 10—10 of FIG. 9, illustrating the relationship between an inlet, outlet, motor and control ports in the housing of the controller assembly of FIG. 9.
Figure 11:
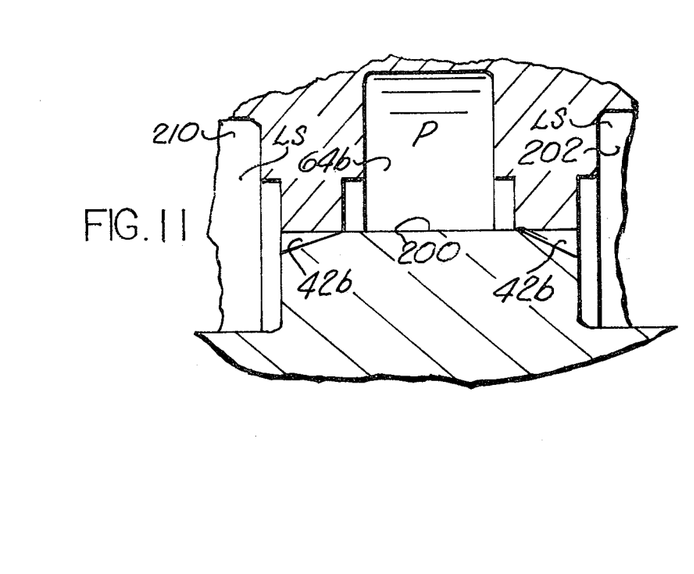
FIG. 11 is an enlarged view of a portion of the controller of FIG. 9.
Figure 12:
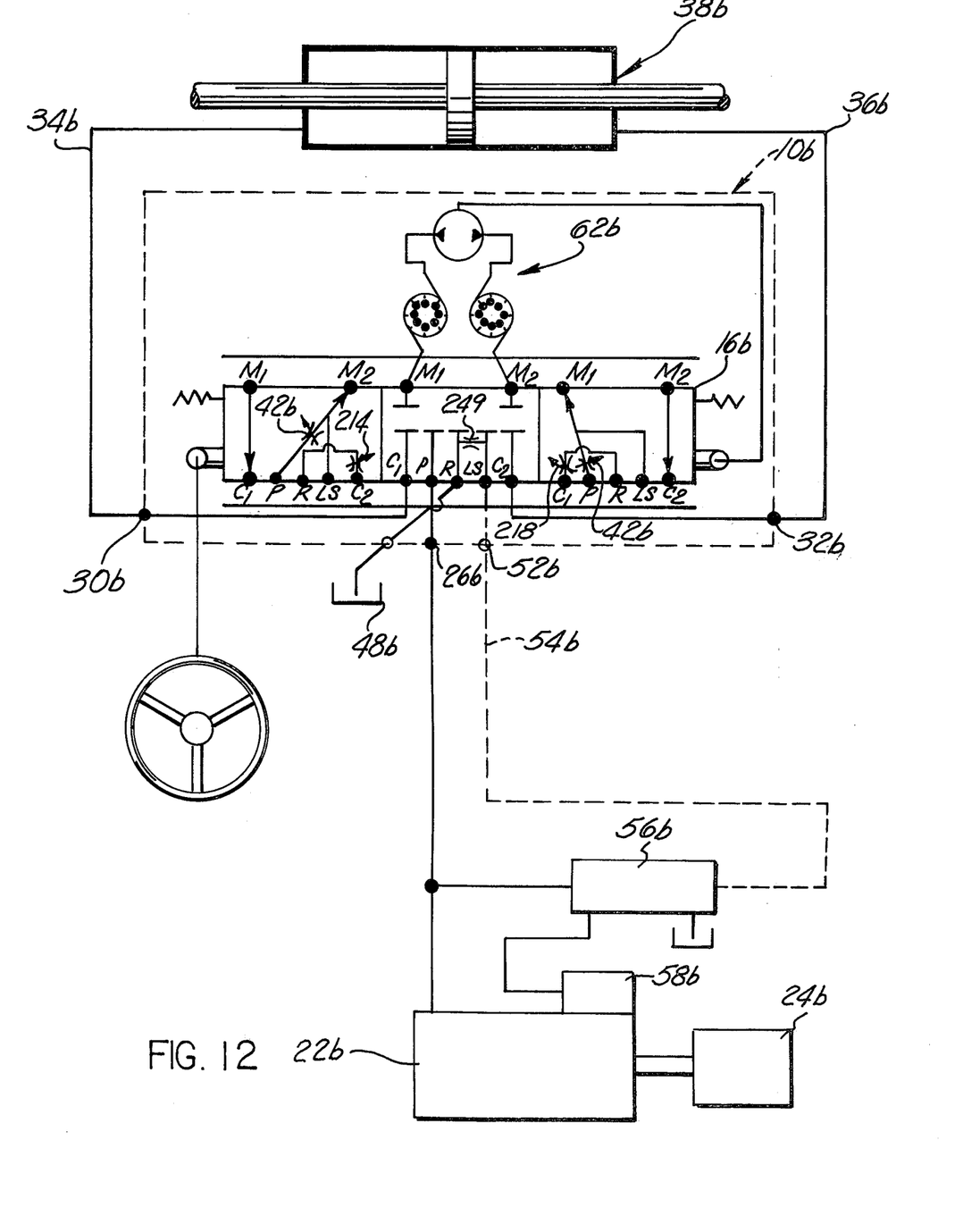
FIG. 12 is a schematic illustration depicting the relationship between the controller assembly of FIG. 9 and a steering motor, variable displacement pump and a pressure-responsive valve assembly for effecting variations in the displacement of the pump.

When the controller 10b or FIG. 9 is in a neutral or unactuated condition, fluid flow to and from the controller through an inlet port 26b, motor ports 30b, 32b, return port 44b, and a control port 52b (see FIG. 10) is blocked. Any stand-by pressure at control port 52b is communicated to drain through orifice 249 (see FIG. 12) and port 44b. Of course, fluid flow to and from metering assembly 62b is blocked. Upon actuation of the valve sleeve 16b toward either the right or left upon either counterclockwise or clockwise rotation of an input shaft 18b, fluid from the inlet port 26b is ported through a variable size orifice 42b to the control port 52b, (see FIGS. 9 and 11, and orifice 249 is closed. The location of orifice 249 is not shown in FIG. 9, since such location may vary and be in the sleeve 16b or housing 12b, as illustrated in FIG. 9, and is within the domain of one skilled in the art.

The orifice 42b includes an annular land 200 formed on the valve sleeve 16b. The annular land 200 blocks fluid flow from the inlet port 26b when the valve sleeve 16b is in the neutral position illustrated in FIG. 9. Upon rotation of the input shaft 18b in the direction of the arrow 72b, the valve sleeve 16b is shifted toward the left by a ball and helical groove arrangement 82b to open the orifice 42b to an extent which corresponds to the rate of rotation of the input shaft 18b and the steering load. This leftward movement of the valve sleeve 16b enables fluid to flow from the inlet port 26b and annular groove 64b through the open orifice 42b to an annular groove 202. The annular groove 202 is connected with the control port 52b through a passage in the controller housing 12b. This passage is indicated schematically at 204 in FIG. 9. The control port 52b is connected with a pressure-responsive valve assembly 56b (see FIG. 12) through a conduit 54b.

Upon a variation in the rate of rotation of the steering wheel and input shaft 18b, the valve sleeve 16b is shifted to vary the size of the orifice 42b and effect actuation of valve assembly 56b, in a manner as described in the afore-mentioned Rau application. Actuation of valve assembly 56b causes a motor 58b to actuate to vary the displacement of a steering pump 22b. Varying the displacement of the steering pump 22b varies the rate at which fluid is connected from the pump to the inlet port 26b with a resulting variation in the rate of fluid flow to the metering mechanism 62b and steering motor 38b.

After flowing from the inlet port 26b to the annular groove 202, the fluid is conducted to an annular groove 88b, since the valve sleeve 16b has been shifted from the neutral position shown in FIG. 9 to a leftward actuated condition. The groove 88b is connected in fluid communication with the metering assembly 62b so that a metered flow of fluid flows from the metering assembly 62b through the interior of the tubular valve sleeve 16b to motor ports 90b formed in a side wall of the valve sleeve. The metered flow of fluid passes through the ports 90b to an annular groove 92b which is connected in fluid communication with the motor port 32b. The motor port 32b is connected with the steering motor 38b through a conduit 36b (see FIG. 12). Therefore, a metered flow of fluid from the metering assembly 62b is conducted to the motor 38b to effect operation of the motor to turn steerable wheels of the vehicle at a rate which varies as a function of variations in the rate of rotation of the input member 18b.

As the motor 38b is operated, fluid discharged from the motor is conducted through a conduit 34b to the motor port 30b. The motor port 30b is connected in fluid communication with an annular groove 108b. Since the valve sleeve 16b has been shifted toward the left from the neutral position illustrated in FIG. 9, fluid can flow from the motor port 108b through a blind annular groove 112b to an annular groove 124b connected with the outlet or drain port 44b (see FIG. 9).

If the rate of rotation of the steering wheel and input member varies while the motor 38b is being operated, or if the steering load varies, relative rotation occurs between the input member 18 and valve sleeve 16b causing the ball and cam arrangement 82b to shift the valve sleeve 16b axially. As this occurs, the size of the orifice 42b is changed so that the pressure conducted from the control port 52b through the conduit 54b to the pressure-responsive valve assembly 56b will be varied. The pressure-responsive valve assembly 56b cooperates with the motor 58b to adjust the rate of fluid flow from the pump 22b to satisfy the changed rate of demand for steering fluid.

Upon rotation of the input shaft 18b in the direction of the arrow 140b in FIG. 9, the ball and helical groove arrangement 82b effects a shifting of the valve sleeve 16b toward the right. This rightward movement of the valve sleeve 16b connects the inlet port 26b and annular groove 64b with an annular groove 210. The annular groove 210 is connected by the housing passage 204 with the control port 52b. In addition, the annular groove 210 is connected with the ports 90b in the valve sleeve 16b. Therefore, fluid from the steering pump 22b can flow from the inlet port 26b through the grooves 64b and 210b to the ports 90b. The fluid then flows through the tubular valve sleeve 16b to the metering assembly 62b.

A metered flow of fluid from the assembly 62b is ported to the annular groove 88b which, due to the rightward shifting of the valve sleeve 16b, is connected with the annular groove 108b. The metered flow of fluid is then conducted from the annular groove 108b to the motor port 30b. The motor port 30b is connected in fluid communication with the steering motor 38b through the conduit 34b (see FIG. 12). Therefore, the metered flow of fluid effects operation of the steering motor to turn the wheels of the vehicle.

As the steering motor 38b is operated, fluid is discharged from the steering motor through the conduit 36b to the motor port 32b which is connected in fluid communication with the annular groove 92b (see FIG. 9). Since the valve sleeve 16b has been shifted toward the right, as viewed in FIG. 9, the fluid discharged from the steering motor 38b can flow from the groove 92b through the blind groove 146b to the annular groove 124b which is connected in fluid communication with the outlet port 44b. It should be noted that the valve sleeve 16b is undercut in such a manner as to provide an anti-cavitation orifice 214 between the annular groove 92b and the blind groove 146b. A similar anti-cavitation orifice 218 is formed between the annular groove 112b and the annular groove 108b when the valve sleeve 16b is shifted leftwardly from the position shown in FIG. 9.

In view of the foregoing description, it can be seen that an improved controller assembly 10 is utilized in a hydrostatic steering system having an engine-driven pump 22. When the controller assembly 10 is in an actuated condition, a pressure-responsive valve assembly 56 is activated to effect operation of a motor 58 to vary the displacement of the pump 22 as a function of variations in the demand for steering fluid flow and pressure resulting from variations in the rate of rotation of the input shaft 18 and/or variations in the steering load.

The controller assembly 10 includes a housing 12 having a valve chamber with an inlet port 26 which receives fluid from the pump. Upon actuation of the valve 16, fluid is conducted through the metering assembly 62 to one of the motor ports 30, 32. The metered flow of fluid from the motor port effects operation of the steering motor 38 to turn the vehicle. In addition, fluid is conducted from the steering motor 38 through the other motor port to the valve chamber 14. The fluid is discharged from the valve chamber 14 to reservoir or drain through an outlet port 44. A control port 52 is connected in fluid communication with the pressure-responsive valve assembly 56. Surfaces on the valve sleeve 16 and housing 12 cooperate to form an orifice 42 which effects a variation in the fluid pressure conducted to the control port 52 as a function of variations in the rate at which the input shaft 18 is rotated and variations in the steering load.

What is claimed is:

1. A mechanism for effecting actuation of a vehicle steering motor to turn vehicle wheels, said mechanism being constructed to be in fluid communication with the steering motor and with a variable delivery fluid source having pressure-responsive means for effecting variations in the delivery of fluid from the source and the steering motor, said mechanism comprising, a housing defining a valve chamber, a valve member located in said valve chamber, said valve member having a neutral position and being movable therefrom to port fluid to said steering motor, said housing having a control port for fluid connection to said pressure-responsive means, a variable orifice formed between said valve member and said housing and communicating with said control port, and means for positioning said valve member as a function of variations in the rate of movement of the input member and variations in the steering load to thereby vary the size of said orifice and the control pressure ported to said pressure-responsive means.

2. A steering mechanism as defined in claim 1 wherein said means for positioning said valve member comprises a manually movable input member connected with said valve member and a metering mechanism connected with said valve member and operable to meter fluid flow to the steering motor in response to movement of the input member.

3. A steering mechanism as defined in claim 2 wherein said valve member and said housing have first passage means for porting fluid to said metering mechanism, second passage means for porting fluid from said metering mechanism to said steering motor, and third passage means for receiving return fluid flow from said steering motor and porting said return flow to drain, and said variable orifice being located in said third passage means through which said return fluid flows.

4. A steering mechanism as defined in claim 2 wherein said valve member and said housing have first passage means for porting fluid to said metering mechanism, second passage means for porting fluid from said metering mechanism to said steering motor, and third passage means for receiving return fluid flow from said steering motor and porting said return flow to drain, said variable orifice being normally open and located in a fourth fluid passage means communicating with said control port and drain.

5. A steering mechanism as defined in claim 4 further including a fixed normally open orifice formed between said valve member and said housing and located in series with said variable orifice.

6. A steering mechanism as defined in claim 2 wherein said valve member and said housing have first passage means for porting fluid to said metering mechanism, second passage means for porting fluid from said metering mechanism to said steering motor, and third passage means for receiving return fluid flow from said steering motor and porting said return flow to drain, and said variable orifice being located in said first passage means for directing fluid to the metering mechanism.

7. A steering mechanism as defined in claim 2 wherein said metering mechanism comprises an orbital rotor member and said valve member comprises a sleeve-like member, porting operatively connecting one end of said valve member to said rotor and said other end thereof to said input member.

8. A mechanism for effecting actuation of a vehicle steering motor to turn vehicle wheels, said mechanism being constructed to be in fluid communication with the steering motor and with a variable delivery fluid source having pressure-responsive means for effecting variations in the delivery of fluid from the source, said mechanism comprising housing means for defining a valve chamber, said housing means including an inlet port adapted to receive fluid from the variable delivery source, first and second motor ports adapted to discharge fluid to and receive fluid from the steering motor, an outlet port adapted to discharge from said housing means fluid received at one of said motor ports, and a control port adapted to be connected in fluid communication with said pressure-responsive means, valve means disposed in said valve chamber for controlling fluid flow between said ports, rotatable input means for operating said valve means from a neutral condition to either one of two actuated conditions in which said valve means is effective to conduct fluid from said inlet port to one of said motor ports and to conduct fluid from the other one of said motor ports to said outlet port, said valve means being effective to conduct fluid pressure to said control port when said valve means is in either one of said actuated conditions, and said valve means including orifice means for causing the fluid pressure conducted to said control port to vary as a function of steering demand, and means for controlling the size of said orifice means in accordance with the demand for steering fluid flow and pressure.

9. A controller assembly as set forth in claim 8 wherein said valve means includes a movable valve member disposed in said valve chamber, said orifice means including a first surface connected with said housing means and a second surface connected with said valve member and cooperable with said first surface to define a first orifice, said second surface being movable with said valve member relative to said housing means and said first surface to vary the flow area of said first orifice upon operation of said valve means between the neutral condition and one of said actuated conditions.

10. A controller assembly as set forth in claim 9 wherein said valve means includes means for conducting fluid from said inlet port to said orifice means and for conducting fluid from said orifice means to said control port when said valve means is in said one of said actuated conditions.

11. A controller assembly as set forth in claim 9 wherein said orifice means further includes a third surface connected with said housing means and a fourth surface connected with said valve member and cooperable with said third surface to define a second orifice in series with said first orifice, said valve means including means for conducting fluid from said inlet port to said first orifice and for conducting fluid from said first orifice to said outlet port when said valve means is in either of said actuated conditions.

12. A controller assembly as set forth in claim 8 wherein said valve means includes a movable valve member disposed in said valve chamber, said orifice means including a first surface connected with said valve member and a second surface connected with said housing means and cooperable with said first surface to define a first orifice, said valve means including means for directing a flow of fluid through said first orifice upon operation of said valve means to either of said actuated conditions.

13. A controller assembly as set forth in claim 12 wherein said valve means includes means for connecting an upstream side of said first orifice means with said control port and for connecting a downstream side of said first orifice with said outlet port upon operation of said valve means to either of said actuated conditions.

14. A controller assembly as set forth in claim 9 wherein said valve means further includes means for connecting the upstream side of said orifice means in fluid communication with said first motor port when said valve means is in one of said actuated conditions and for connecting the upstream side of said orifice means in fluid communication with the said second motor port when said valve means is in the other of said actuated conditions.

15. A controller assembly as set forth in claim 9 wherein said valve means includes means for connecting an upstream side of said orifice means in fluid communication with said first motor port and said control port and means for connecting a downstream side of said orifice means in fluid communication with said outlet port upon operation of said valve means to a first one of said actuated conditions, said valve means further including means for connecting the upstream side of said orifice means in fluid communication with said second motor port and said control port when said valve means is in a second one of said actuated conditions.

* * * * *